(12) United States Patent
Namburu et al.

(10) Patent No.: US 8,286,244 B2
(45) Date of Patent: Oct. 9, 2012

(54) METHOD AND SYSTEM FOR PROTECTING A COMPUTER NETWORK AGAINST PACKET FLOODS

(75) Inventors: Maruthi Ram Namburu, Bangalore (IN); Mahesh Mylarappa, Bangalore (IN); Venkataraman Kamalaksha, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1203 days.

(21) Appl. No.: 12/013,890

(22) Filed: Jan. 14, 2008

(65) Prior Publication Data

US 2008/0178279 A1 Jul. 24, 2008

(30) Foreign Application Priority Data

Jan. 19, 2007 (IN) .............................. 139/CHE/2007

(51) Int. Cl.
*G06F 11/00* (2006.01)
*G06F 15/173* (2006.01)

(52) U.S. Cl. .......................................... 726/23; 709/223
(58) Field of Classification Search .................... 726/23; 709/223

See application file for complete search history.

(56) References Cited

U.S. PATENT DOCUMENTS

| 7,331,060 | B1* | 2/2008 | Ricciulli | 726/22 |
| 7,526,807 | B2* | 4/2009 | Chao et al. | 726/23 |
| 7,584,507 | B1* | 9/2009 | Nucci | 726/23 |
| 7,904,959 | B2* | 3/2011 | Sidiroglou et al. | 726/22 |
| 2002/0083331 | A1* | 6/2002 | Krumel | 713/200 |
| 2003/0074584 | A1* | 4/2003 | Ellis | 713/201 |
| 2003/0110394 | A1* | 6/2003 | Sharp et al. | 713/200 |
| 2003/0145232 | A1* | 7/2003 | Poletto et al. | 713/201 |
| 2004/0042470 | A1* | 3/2004 | Cooper et al. | 370/401 |
| 2004/0054924 | A1* | 3/2004 | Chuah et al. | 713/201 |
| 2004/0131056 | A1 | 7/2004 | Dark | |
| 2004/0215976 | A1* | 10/2004 | Jain | 713/201 |
| 2004/0250124 | A1* | 12/2004 | Chesla et al. | 713/201 |
| 2005/0125195 | A1* | 6/2005 | Brendel | 702/182 |
| 2005/0182960 | A1* | 8/2005 | Petry et al. | 713/200 |
| 2006/0037075 | A1* | 2/2006 | Frattura et al. | 726/22 |

(Continued)

FOREIGN PATENT DOCUMENTS

JP 2006-311084 11/2008

(Continued)

OTHER PUBLICATIONS

Uday Kiran Tupakula et al., "A Practical Method to Counteract Denial of Service Attacks"; ACM Paper—2003, pp. 275-284, vol. 35.

(Continued)

*Primary Examiner* — Techane Gergiso

(57) ABSTRACT

A method of controlling protection of a computing device or computer network. The method comprises directing incoming data packets to the computing device or computer network via a rate limiting system that is adapted to parse the data packets, providing the computing device or computer network with at least one threshold parameter for identifying a data flood condition, the threshold parameter being a function of one or more available computing resources of the computing device or computer network; the computing device or computer network responding to incoming data packets received via the rate limiting system that cause the at least one threshold parameter to be breached by generating event data; generating feedback data based on the event data; transmitting the feedback data to the rate limiting system; and the rate limiting system modifying its behavour according to the feedback data.

18 Claims, 3 Drawing Sheets

U.S. PATENT DOCUMENTS

| | | | |
|---|---|---|---|
| 2006/0146816 A1* | 7/2006 | Jain | 370/389 |
| 2006/0187821 A1 | 8/2006 | Watanabe | |
| 2006/0288411 A1* | 12/2006 | Garg et al. | 726/22 |
| 2007/0110053 A1* | 5/2007 | Soni et al. | 370/389 |
| 2007/0121596 A1* | 5/2007 | Kurapati et al. | 370/356 |
| 2007/0171824 A1* | 7/2007 | Ruello et al. | 370/232 |
| 2007/0209068 A1* | 9/2007 | Ansari et al. | 726/13 |
| 2007/0280114 A1* | 12/2007 | Chao et al. | 370/235.1 |
| 2008/0052774 A1* | 2/2008 | Chesla et al. | 726/13 |
| 2008/0134329 A1* | 6/2008 | Perreault et al. | 726/22 |
| 2009/0013404 A1* | 1/2009 | Chow et al. | 726/22 |

FOREIGN PATENT DOCUMENTS

WO    WO2004/059914    7/2004

OTHER PUBLICATIONS

Emmanuel Guiton, "A Rate-Limiting System to Mitigate Denial of Service Attacks", Oct. 23, 2003.

* cited by examiner

METHOD AND SYSTEM FOR PROTECTING A COMPUTER NETWORK AGAINST PACKET FLOODS

This application claims priority from Indian patent application IN139/CHE/2007, filed on Jan. 19, 2007. The entire content of the aforementioned application is incorporated herein by reference.

BACKGROUND OF THE INVENTION

In computing, firewalls are generally used to provide perimeter defenses. They are typically implemented on gateways located between one network (e.g. a public network such as the Internet) and another network (e.g. a private network such as a corporate intranet), and filter the traffic that is transmitted therebetween. A system firewall, on the other hand, filters the traffic that enters or exits an individual host, and can be used to protect the host—which may form a part of an intranet—against attacks originating from within the intranet or external attacks that have breached a perimeter firewall.

Both approaches have limitations. Floods (such as IP fragment floods and SYN floods) can comprise data packets that are not "unwanted", and neither perimeter firewalls nor system firewalls will filter such floods effectively. The perimeter firewall cannot determine the capabilities and the current situation of the host. A server that has a low configuration or is heavily loaded can process fewer incoming packets than a server with a higher configuration or a significantly lesser load, so the filtering provided by a perimeter firewall may not be appropriate to such cases. If a flood is allowed past the perimeter firewall to be handled by the system firewall, host resources are wasted and—moreover—the local LAN subnet (which may constitute an intranet) may be flooded.

That is, perimeter firewalls do not always constrain traffic rates to levels that the host can handle. If excessive traffic reaches the host system, the host must devote considerable resources to handling that traffic, even if only to discard it. Thus, if packet rate is not controlled at the perimeter level, a packet flood will waste host system's resources.

Moreover certain type of flooding attacks (e.g. SYN attacks) that are targeted at Layer 4 protocols, such as the TCP modules of the stack, can be efficiently detected at Layer 4 level. Since most existing host-based or perimeter firewalls filter at IP level, floods are not effectively detected at that level. There is presently no optimal method of calculating the rate of SYN packet arrival at an IP-address/Port combination at the perimeter level.

A Controller and Agent model has been proposed to minimize DoS (Denial of Service) or DDoS (Distributed Denial of Service) attacks caused by the various kind of packet floods. A packet marking technique is used, and the attack traffic is blocked at the router nearest to the attacking system by establishing the attack signature for the attacking host.

Another proposed method uses the attack detection capabilities of an intrusion detection system (IDS) and Quality of Service (QoS) concepts to rate limit incoming packet flood attacks. Incoming network traffic is first analyzed by an IDS and the information is fed to a Rate limiting system Controller (RLS-controller). RLS-Controller analyzes the information and appropriately instructs the RLS-agents to do the rate limiting.

A system has also been proposed in which a network traffic evaluation device is used to warn of or prevent traffic abnormalities, such as denial of service attacks. The device includes a data interface to receive one or both of network traffic and data indicative of characteristics of network traffic. The network traffic and/or data received by the data interface is processed for predetermined characteristics and—upon detection of these predetermined characteristics—the network traffic may be redirected and/or blocked by a network device.

Another proposed monitor system for detecting attacks on a site in a communication network and for taking action to reduce or redirect such attacks reviews incoming data packets and sends directions to at least one router to change the data flow in the system. The data packets and the resulting work flow are modified for certain conditions, and for certain conditions within defined time slices, and action is taken when the monitored condition is contrary to expected conditions.

These proposed methods and systems endeavour to either completely filter or rate limit offending traffic. However, they do not attempt to improve the detection of offending traffic in a system-sensitive manner.

BRIEF DESCRIPTION OF THE DRAWING

In order that the invention may be more clearly ascertained, embodiments will now be described, by way of example, with reference to the accompanying drawing, in which.

DETAILED DESCRIPTION OF THE EMBODIMENTS

There will be provided a method of protecting a computing device or computer network against packet floods.

In the following, reference is made to a 'rate limiting system' (or RLS), which refers to any entity that resides at the periphery of an intranet or other network and has the ability to parse data packets and control the rate and the type of data packets (i.e. traffic) that is permitted to enter that network. The RLS may be implemented as software running on an existing operating system, or implemented as a hardware device with the rate limiting functionality programmed into the device's hardware, as software provided in its firmware or as an extension to the basic functionality of a firewall.

In one embodiment, the method comprises directing incoming data packets to the computing device or computer network via a rate limiting system that is adapted to parse the data packets, providing the computing device or computer network with at least one threshold parameter for identifying a data flood condition, the threshold parameter being a function of one or more available computing resources of the computing device or computer network; the computing device or computer network responding to incoming data packets received via a rate limiting system that cause the at least one threshold parameter to be breached by generating event data; generating feedback data based on the event data; transmitting the feedback data to the rate limiting system; and the rate limiting system modifying its behaviour according to the feedback data.

There will also be provided a computing system. In one embodiment, the computing system comprises a computing device and a rate limiting system in electronic communication with said computing device, located to intercept data packets transmitted to said computing device and adapted to parse said data packets. The computing device is provided with at least one threshold parameter for identifying a data flood condition, the threshold parameter being a function of one or more available computing resources of the computing device and is configured to respond to incoming data packets received via the rate limiting system that cause the at least one threshold parameter to be breached by generating event data, generating feedback data based on the event data, and transmitting the feedback data to the rate limiting system. The feedback data is adapted for use by the rate limiting system to modify its behaviour according to the feedback data.

Figure 1:
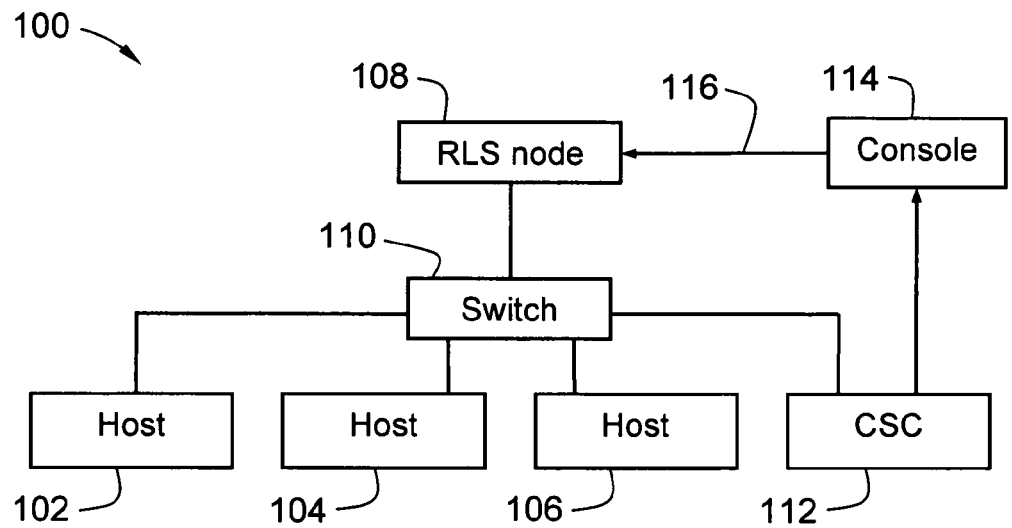
FIG. 1 is a schematic view of a local computing network according to an embodiment of the present invention.

FIG. 1 is a schematic view of a local computing network 100 according to an embodiment of the present invention. The network 100 includes a plurality of computers in the form of host systems 102, 104, 106 (which form a subnet), a rate limiting system in the form of packet parsing and rate limiting system 108 (referred to hereinafter as RLS node 108) and a switch 110 to which host systems 102, 104, 106 and RLS node 108 are connected. Network 100 operates as a timeshare LAN mediated by switch 110. RLS node 108 includes filtering rules on the basis of which it filters incoming (and optionally, outgoing) content.

The local network 100 also includes a Central Switch Controller (or CSC) 112, connected to switch 110. Host systems 102, 104, 106 send feedback (as is described below) to CSC 112 using the timeshare LAN. CSC 112 acts as a single agent for collecting feedback from host systems 102, 104, 106 on the shared LAN and transmitting it to RLS node 108 in a secure manner. CSC 112 authenticates a respective host system before accepting feedback from it, and collates all received feedback and, as described above, transmits it to RLS node 108 using a secure connection. In this embodiment, network 100 includes a console 114 coupled to CSC 112, from which CSC 112 can be controlled. The network 100 also includes an RS232 connection 116 between the console 114 and RLS node 108 for secure communication therebetween. In other embodiments, however, the console 114 is omitted and CSC 112 and RLS node 108 communicate over a standard Ethernet connection. Once RLS node 108 has received the feedback, it updates its filtering rules on the basis of that feedback.

Figure 2:
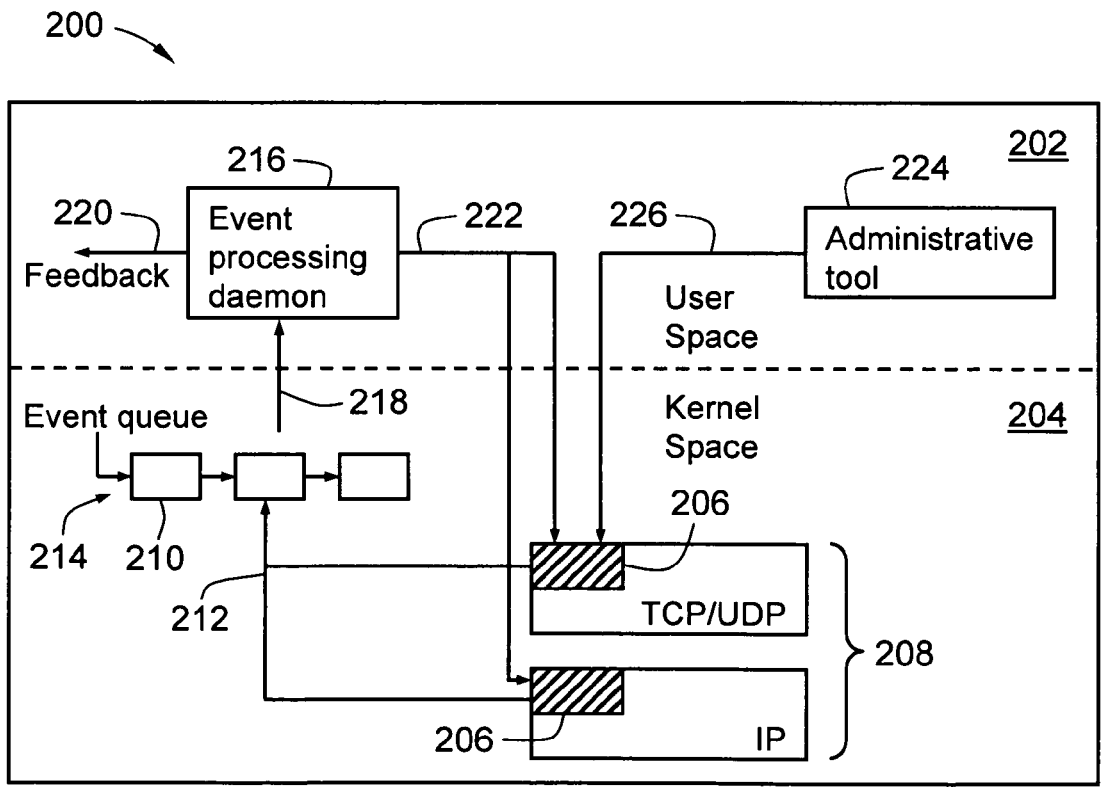
FIG. 2 is a schematic view of an exemplary host system within the local computing network of FIG. 1 according to an embodiment of the present invention.
Figure 3A:
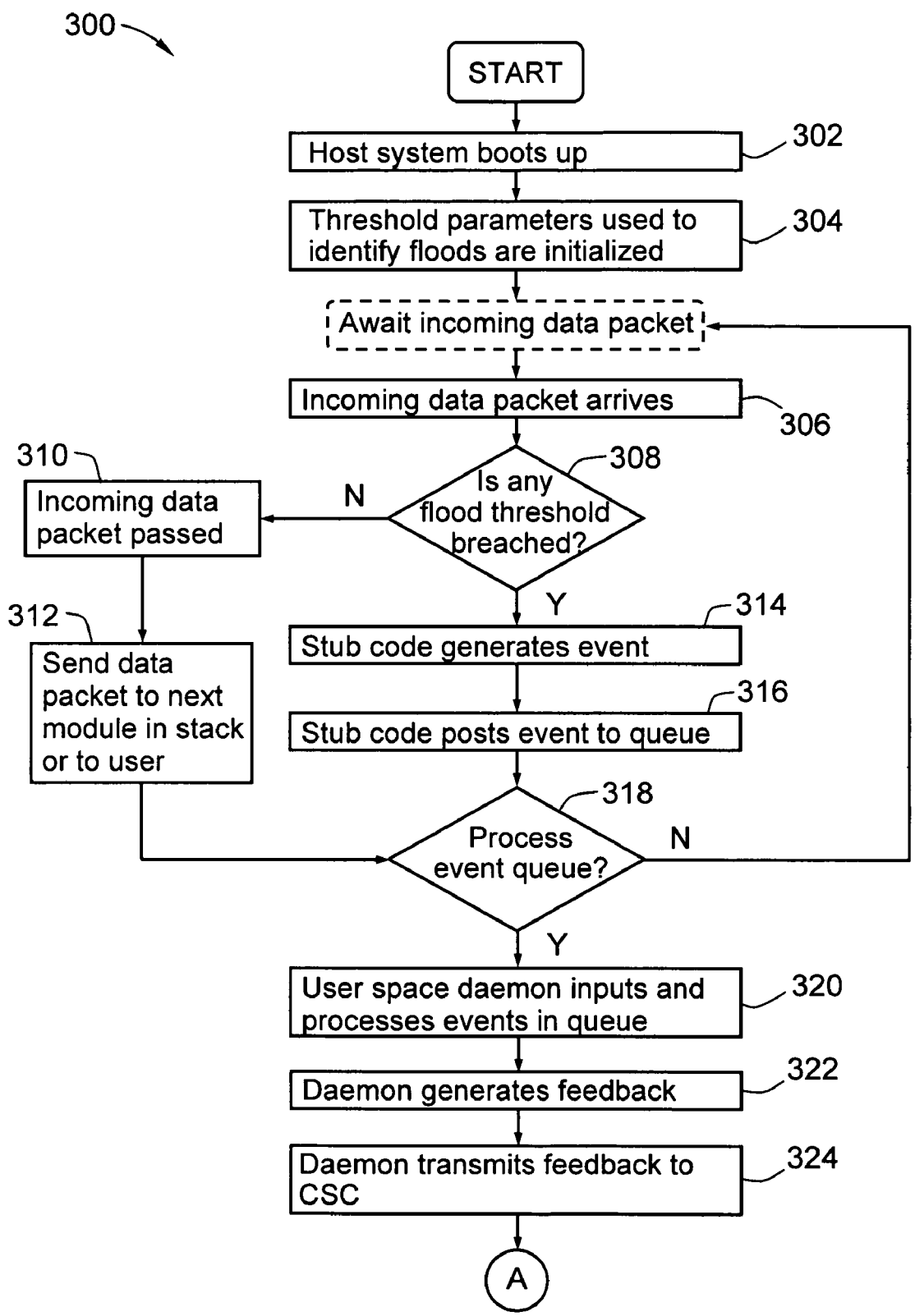
FIGS. 3A and 3B are a flow diagram of the method according to an embodiment of the present invention employed by the host system of FIG. 2 according to an embodiment of the present invention.
Figure 3B:
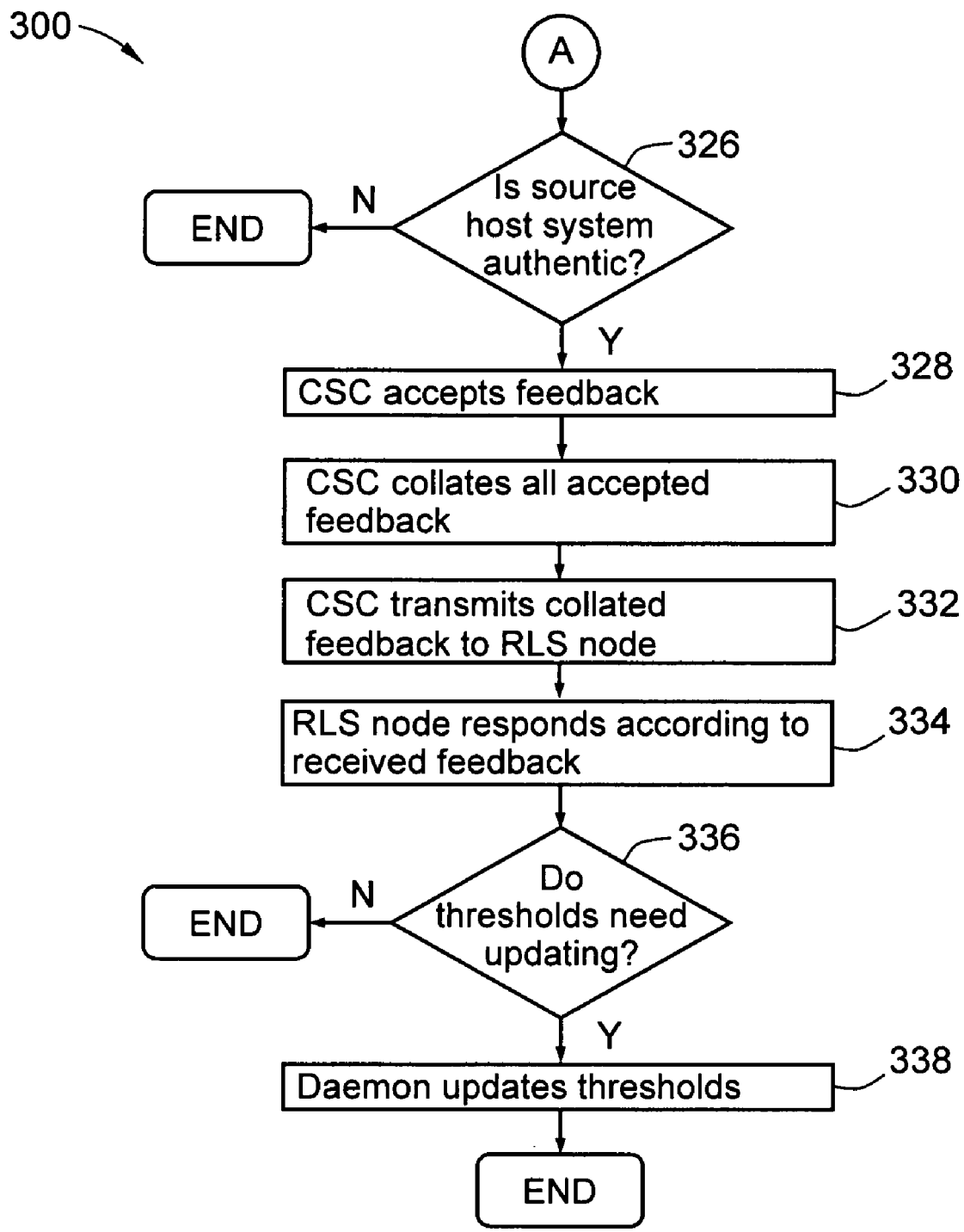

The operation of this feedback mechanism of network 100 is described below by reference to FIGS. 2, 3A and 3B. FIG. 2 is a operational diagram of a host system 200 (representing any one of host systems 102, 104, 106); host system 200 is shown divided logically into user space 202 and kernel space 204. FIGS. 3A and 3B are a flow diagram of the steps of the method by which the feedback mechanism operates according to this embodiment.

Thus, at step 302 (of FIG. 3A), host system 200 (of FIG. 2) boots up. At step 304, all the threshold parameters used to identify the various types of data floods are initialized based on the currently available resources (including memory and the number of CPUs) of host system 200. At this point the host system 200 is ready to respond should an incoming data packet arrive.

At step 306, an incoming data packet arrives at host system 200, having been passed by RLS node 108 (not shown in FIG. 2). At step 308 stub code 206 added to the TCP/IP stack 208 of host system 200 determines whether this incoming data packet causes any flood threshold to be breached (which typically comprises a flood threshold being exceeded); if not, at step 310 the incoming data packet accepted without alarm and at step 312 the data packet is sent to the next module in the stack or to the user. Processing then continues at step 318. If, at step 308, the incoming data packet does cause a flood threshold to be breached, processing continues at step 314 where an event 210 is generated by the stub code 206. Next, at step 316 that event 210 is posted 212 by the stub code 208 to an event queue 214, and processing at step 318.

At step 318, it is determined whether event queue 214 should be processed. This decision can be based on any suitable criterion or criteria, such as whether the number of events in the queue 214 has reached a predetermined threshold, or whether a predetermined period has elapsed since the last processing of the events in the event queue 214. In this embodiment, the queue 214 is processed whenever any event in the queue 214 is older than a predetermined period, or if more than a predetermined number of events are in the queue 214, whichever occurs first.

Thus, if at step 318, it is determined that event queue 214 should not be processed, the host system 200 resumes awaiting the arrival of incoming data packets. If, at step 318, it is determined that event queue 214 should be processed, processing continues at step 320, where a daemon 216 running in the user space 202 inputs 218 and processes these events 210 and, at step 322, generates feedback data.

At step 324, the daemon 216 transmits the feedback to the CSC 112. At step 326 (of FIG. 3B), CSC 112 authenticates the host system 200 from which the feedback has been received. If the host system is authenticated, at step 328 the feedback is accepted by CSC 112; if not, the feedback is not accepted by CSC 112. It should be noted at this point that CSC 112 receives such feedback from host system 200 and other host systems in the subnet, so the aforementioned steps 306 to 328 will generally have occurred multiple times in respect of each host system since the host system 200 and the other host systems in the subnet booted up. Hence, when processing then continues at step 330, CSC 112 collates all accepted feedback (from host system 200 and any other host systems) and, at step 332, transmits the collated feedback to RLS node 108 using a secure connection.

At step 334 RLS node 108 responds to the collated feedback with an appropriate action according to the feedback, such as limiting the rate at which the particular type of data packets that gave rise to a respective event or events 210 will be forwarded to host system 200 (or whatever other host systems generated the respective feedback). In this way the host systems (or nodes) in the local network can co-exist and control the floods depending upon their individual resources and capabilities. Thus, flood attacks are controlled at the perimeter level, though with feedback from the host systems. By providing feedback to RLS node 108 about the amount and type of required filtering, the filtering provided by RLS node 108 can be automatically tuned according to the current load and the capabilities of host system 200. This saves host system resources, as network floods are reduced or stopped before reaching the subnet.

At step 336 user space daemon 216 determines whether the thresholds need updating in accordance with current system conditions (which may have changed since the host system 200 booted up). The user space daemon 216 makes this determination by determining whether there has been any significant change in the available resources and, if so, recalculating the thresholds accordingly. (In an alternative embodiment, such updating is simply performed periodically, even though this may produce little if any change in the thresholds if no significant change in the available resources has occurred.) If not, processing of this method ends but, if so, processing continues at step 338 where daemon 216 updates 222 the thresholds accordingly. Processing of this method then ends.

It should be noted that the host system 200 includes an administrative tool 224 so that an administrator may manually set 226 the thresholds (including overriding the values computed by the user space daemon 216) if needed.

Thus, network flood detecting/determining capabilities are added to TCP/IP stack of the host system 200 (in the form of stub code), but optionally that capability may be implemented as a separate module on the host system. The detection/determination of a flood attack can also—optionally—be enabled or disabled.

The foregoing description of the exemplary embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is to be accorded the widest scope consistent with the principles and novel features disclosed herein.

The invention claimed is:

1. A computing device, comprising:
   resources including at least one Central Processing Unit, wherein the computing device is to communicate over a network with a rate limiting system configured to use at least one filtering rule to intercept and control a rate of data packets directed from a source to said computing device; and
   a module to use at least one threshold parameter for identifying a data flood condition, said at least one threshold parameter being a function of the resources of said computing device, and said module being configured to respond to incoming data packets received via said rate limiting system that cause said at least one threshold parameter to be breached by generating event data, generating feedback data based on said event data, and transmitting said feedback data to said rate limiting system;
   wherein transmission of said feedback data to said rate limiting system is to cause said rate limiting system to modify the at least one filtering rule according to said feedback data.

2. The computing device as claimed in claim 1, wherein said feedback data is to be communicated from said computing device to said rate limiting system through a central switch controller.

3. The computing device as claimed in claim 1, wherein said computing device is configured to generate said at least one threshold parameter.

4. The computing device as claimed in claim 1, wherein said computing device is provided with a plurality of said threshold parameters for identifying respective data flood conditions.

5. The computing device as claimed in claim 1, wherein said computing device is configured to check whether the resources have changed and, if so, to update said at least one threshold parameter.

6. The computing device as claimed in claim 1, further comprising a TCP/IP stack having the module.

7. The computing device as claimed in claim 1, wherein modification of the at least one filtering rule causes a change in a rate of incoming data packets received by said computing device from said rate limiting system.

8. The computing device as claimed in claim 1, wherein modification of the at least one filtering rule causes a change in a rate and type of incoming data packets received by said computing device from said rate limiting system.

9. The computing device as claimed in claim 1, further comprising:
   an event queue to store said event data associated with a first event corresponding to said at least one threshold parameter being breached, where the event queue is to store further event data corresponding to other events corresponding to breach of said at least one threshold parameter;
   an event processing module to:
      determine whether the events of the event queue should be processed; and
      in response to determining that the events of the event queue should be processed, process the event data in the event queue to cause generation of respective feedback data to send to the rate limiting system.

10. The computing device as claimed in claim 9, wherein the event processing module is to determine that the events of the event queue should be processed in response to detecting a condition selected from among (1) any event of the event queue is older than a predetermined time period, and (2) a number of the events in the event queue exceed a predetermined number.

11. A method of controlling protection of a computing device, comprising:
   directing, by a rate limiting system, incoming data packets to said computing device after filtering of the incoming data packets by the rate limiting system using at least one filtering rule;
   receiving, by the rate limiting system from said computing device, feedback data associated with breach of at least one threshold parameter for identifying a data flood condition due to receipt of the incoming data packets at said computing device, said at least one threshold parameter being a function of one or more available computing resources of said computing device;
   modifying, by the rate limiting system, the at least one filtering rule according to said feedback data, wherein the rate limiting system communicates the data packets and feedback data over a network with computing device.

12. A rate limiting system comprising:
   hardware; and
   a filtering module to:
      receive data packets from a first network and directed to a first computing device in a second, different network;
      control a rate of the data packets permitted to enter the second network, based on at least one filtering rule;
      send filtered data packets after performing the controlling, over the second network to the first computing device;
      receive feedback data from the first computing device, wherein the received feedback data is based on the first computing device detecting breach of a threshold at the first computing device due to receipt of the filtered data packets at the first computing device; and
      modify the at least one filtering rule using the feedback data.

13. The rate limiting system as claimed in claim 12, wherein the filtering module is to change, due to the modified at least one filtering rule, the control of the rate of data packets permitted to enter the second network for communication to the first computing device.

14. The rate limiting system as claimed in claim 12, wherein the filtering module is to:
  receive further data packets from the first network and directed to a second computing device in the second network;
  control a rate of the further data packets permitted to enter the second network for communication to the second computing device, based on at least one second filtering rule;
  send second filtered data packets after performing the controlling based on the at least one second filtering rule, over the second network to the second computing device;
  receive second feedback data from the second computing device, wherein the received feedback data is based on the second computing device detecting breach of a threshold at the second computing device due to receipt of the second filtered data packets at the second computing device; and
  modify the at least one second filtering rule using the second feedback data.

15. A method comprising:
  receiving, by a computing device, data packets over a network from a rate limiting system that intercepts data packets directed to the computing device and that controls, using at least one filtering rule, a rate of the intercepted data packets permitted to be communicated to the computing device;
  detecting, by the computing device, a breach of at least one threshold parameter for identifying a data flood condition due to the received data packets, the at least one threshold parameter being a function of resources of the computing device;
  generating, by the computing device, feedback data in response to occurrence of the breach; and
  sending, by the computing device, the feedback data to the rate limiting system to cause the rate limiting system to modify the at least one filtering rule.

16. The method as claimed in claim 15, further comprising providing said computing device with a plurality of said threshold parameters for identifying respective data flood conditions.

17. The method as claimed in claim 15, further comprising checking whether said resources have changed and, if so, updating said at least one threshold parameter.

18. The method as claimed in claim 15, further comprising providing a TCP/IP stack in said computing device, wherein a module in the TCP/IP stack performs the detecting.

* * * * *